United States Patent
Ishizaki et al.

(10) Patent No.: US 7,760,819 B2
(45) Date of Patent: Jul. 20, 2010

(54) DIGITAL WIRELESS RECEIVER

(75) Inventors: Haruya Ishizaki, Tokyo (JP); Masayuki Mizuno, Tokyo (JP)

(73) Assignee: NEC Corporation, Tokyo (JP)

(*) Notice: Subject to any disclaimer, the term of this patent is extended or adjusted under 35 U.S.C. 154(b) by 719 days.

(21) Appl. No.: 11/718,216

(22) PCT Filed: Oct. 27, 2005

(86) PCT No.: PCT/JP2005/019761

§ 371 (c)(1),
(2), (4) Date: Apr. 27, 2007

(87) PCT Pub. No.: WO2006/046632

PCT Pub. Date: May 4, 2006

(65) Prior Publication Data

US 2008/0112508 A1    May 15, 2008

(30) Foreign Application Priority Data

Oct. 27, 2004    (JP) .............................. 2004-312270

(51) Int. Cl.
*H03K 9/00*    (2006.01)
(52) U.S. Cl. ..................... 375/316; 375/318; 375/324; 375/345
(58) Field of Classification Search .................. 375/316, 375/318, 324, 345
See application file for complete search history.

(56) References Cited

U.S. PATENT DOCUMENTS 5,179,730 A * 1/1993 Loper .......................... 455/266

FOREIGN PATENT DOCUMENTS

| JP | 06-244748 A | 9/1994 |
|----|-------------|--------|
| JP | 06-261080 A | 9/1994 |
| JP | 08-097874 A | 4/1996 |
| JP | 08-242181 A | 9/1996 |
| JP | 10-229336 A | 8/1998 |
| JP | 2001-053728 A | 2/2001 |
| JP | 2001-257731 A | 9/2001 |
| JP | 2002-044049 A | 2/2002 |
| JP | 2002-051016 A | 2/2002 |
| JP | 2002-374181 A | 12/2002 |
| JP | 2003-143247 A | 5/2003 |
| JP | 2003-283413 A | 10/2003 |
| JP | 2003-338771 A | 11/2003 |
| JP | 2004-194068 A | 7/2004 |
| JP | 2004-242246 A | 8/2004 |

OTHER PUBLICATIONS

K. Muhammad et al. "A Discrete-Time Bluetooth Receiver in a 0.3μm Digital CMOS Process" IEEE International Solid-State Circuits Conference, ISSCC, Feb. 17, 2004, pp. 2 to 24.

* cited by examiner

*Primary Examiner*—Shuwang Liu
*Assistant Examiner*—Kabir A Timory
(74) *Attorney, Agent, or Firm*—Sughrue Mion, PLLC

(57) ABSTRACT

In a wireless receiver that receives an electric signal that has undergone digital modulation, a sample-hold circuit converts a wireless modulated signal, which is a continuous time signal, to a discrete time signal, and the frequency band is converted and selected by means of a band-pass filter. A demodulation circuit carries out demodulation based on the instantaneous value of the voltage amplitude of the modulated signal. A shut-down circuit further effects adaptive control of the circuit shut-down time to minimize the circuit activation time while ensuring that the demodulation error rate of the demodulated baseband signal satisfies a value stipulated by the communication standard.

8 Claims, 12 Drawing Sheets ced to increase the selectivity of the frequency band,
and the digital wireless receiver is not limited to the configuration shown in FIG. 1.

DIGITAL WIRELESS RECEIVER

TECHNICAL FIELD

The present invention relates to a digital wireless receiver.

BACKGROUND ART

As shown in, for example, JP-A-2002-374181 (Patent Document 1), digital wireless receivers of the prior art are fabricated by existing integrated circuit production technology to reduce the number of expensive off-chip elements such as surface acoustic wave filters, thereby realizing both low cost and low power consumption.

FIG. 1 is a block diagram of a digital wireless receiver of the prior art. As shown in FIG. 1, this digital wireless receiver of the prior art comprises: antenna 100, radio frequency band selection filter 101, amplifier 102, sample-hold circuit 105, I-phase band-pass filter 108, Q-phase band-pass filter 109, I-phase analog/digital converter 110, and Q-phase analog/digital converter 111.

Antenna 100 receives a radio signal. Radio frequency band selection filter 101 selects only the band used in communication from among the various frequency components contained in the received signal. Amplifier 102 amplifies the output signal of the radio frequency band selection filter 101. Sample-hold circuit 105 samples the output signal of amplifier 102 and then holds for a predetermined time period to produce a discrete time signal. Sample-hold circuit 105 includes: I-phase sampling switch 103 and Q-phase sampling switch 104 that are turned on and off in accordance with sampling clocks supplied from I-phase sampling clock distribution system 114 and Q-phase sampling clock distribution system 115, respectively, to sample the input signal at a predetermined time interval; and I-phase sampling capacity module 106 and Q-phase sampling capacity module 107 for holding each signal level of the I-phase and Q-phase, respectively, that are sampled for the predetermined time period. I-phase band-pass filter 108 and Q-phase band-pass filter 109 each eliminate unnecessary aliasing components that are generated by discretization of signals and unnecessary frequency components such as undesired channels from the output of I-phase sampling capacity module 106 and Q-phase sampling capacity module 107, respectively, of sample-hold circuit 105. I-phase analog/digital converter 110 and Q-phase analog/digital converter 111 each convert the output signals of I-phase band-pass filter 108 and Q-phase band-pass filter 109, respectively, from analog signals to digital signals. It is to be noted that a plurality of RF band-pass filters may be cascode-connected to increase the selectivity of the frequency band, and the digital wireless receiver is not limited to the configuration shown in FIG. 1.

Operation of the above-described digital wireless receiver of the prior art will now be described. First, a radio signal is converted to an electrical signal by antenna 100. Due to attenuation undergone when being propagated through space, the converted electrical signal is extremely weak, and the radio signal is further mixed with, for example, other signals used in communication apparatus. As a result, the receiver must amplify the signal to a level that allows demodulation while suppressing to the utmost the occurrence of, for example, thermal noise, and must further eliminate unnecessary mixed signals to selectively extract only the signal that is used in communication. To this end, radio frequency band selection filter 101 that selectively passes the frequency band used in radio communication and amplifier 102 are connected in the section that follows antenna 100 and respectively serve the roles of frequency selection and signal amplification.

However, due to the band-pass characteristics of radio frequency band selection filter 101 that is in common use, undesired frequency components typically remain at the time that a signal is supplied from radio frequency band selection filter 101 and amplifier 102. Further filtering must therefore be carried out to eliminate undesired frequency components. The frequency selection that is carried out in the latter stage for this purpose eliminates signals of bands extremely close to the frequency band of the desired signal. This calls for a filter wherein a band that signals are passed and a band that signals are blocked, are close, i.e., a filter having a high cut-off characteristic. Filters having higher cut-off characteristics also have greater filter circuit scale, and even among filters having the same cut-off characteristic, filters having higher center frequency of the passed frequency band have greater scale. For this reason, increasing frequency selectivity while suppressing circuit scale necessitates the implementation of frequency conversion.

In order to achieve lower power consumption while suppressing a further expansion of circuit scale in this frequency conversion, the receiver of the prior art shown in FIG. 1 comprises sample-hold circuit 105, I-phase band-pass filter 108, and Q-phase band-pass filter 109. A description will now be given of the reasons for carrying out frequency conversion by means of sample-hold circuit 105, I-phase band-pass filter 108, and Q-phase band-pass filter 109. When a signal continuous over time and having a particular frequency band is converted to a discrete time signal at fixed intervals by using sample-hold circuit 105, other frequency components may be reproduced from this discrete time signal that are outside the original input signal. Frequency components contained in a discrete signal that are outside the frequency band of the original input signal are termed "aliases." Generally, any time function in which the frequency band is limited within W is uniquely expressed by means of a sampling value at a discrete time for each ½W. When a signal is sampled at a time interval greater than this time interval, aliases overlap, lowering the signal-to-noise ratio of the modulated signal. This is a fundamental theory of digital signal processing known as "Shannon's sampling theorem" that calls for sampling at a sampling frequency that is at least twice the frequency band value of a modulated signal. This "sampling theorem" is a basic premise for dealing with discrete signals and will not be particularly mentioned in the following discussion. If only the desired band is selected/extracted by a digital filter from among the multiplicity of alias components that are generated by the discretization of the output signal of amplifier 102 at the sampling frequency demanded from this sampling theorem, the center frequency of the band can be converted without damaging the baseband signal.

In this example of the prior art, an input modulated signal is sampled by turning I-phase sampling switch 103 and Q-phase sampling switch 104 on and off by means of I-phase sampling clocks and Q-phase sampling clocks that are 90° out of phase with I-phase sampling clocks, respectively, and the results are held for a predetermined time interval in I-phase sampling capacity 106 and Q-phase sampling capacity 107, respectively. This operation allows the input signal to be separated into an I-component and Q-component and converted to discrete time signals. The desired frequency band is selected/extracted for the I and Q components by means of I-phase band-pass filter 108 and Q-phase band-pass filter 109 that are connected to the output of sample-hold circuit 105. The signals are then demodulated to digital baseband signals by I-phase analog/digital converter 110 and Q-phase analog/ digital converter 111, respectively. The digital baseband signals that have been demodulated are provided to I-phase physical layer signal processor 112 and Q-phase physical layer signal processor 112, respectively. The above-described sequence of operations repeats as long as the input of packet signals continues.

As described in JP-A-2003-338771 (Patent Document 2), one example of the prior art aims for lower power consumption by shutting down the circuit while packet communication is not being carried out. However, because no mention is made regarding techniques for quickly completing demodulation when carrying out demodulation for packet transmission and reception, all circuits must be operated during all symbol intervals. As a result, there is no example in the prior art for lowering power consumption by plans such as shutting down circuits during symbol intervals.

Patent Document 1: JP-A-2002-374181

Patent Document 2: JP-A-2003-338771

DISCLOSURE OF THE INVENTION

Problem to be Solved by the Invention

The above-described digital wireless receivers of the prior art suffer from the following drawbacks:

Firstly, when a digital modulated signal is demodulated using an analog/digital converter, lowering power consumption of the demodulation circuit entails some type of device or circuit scheme. This problem occurs because the receiver operates throughout the time that the receiver is carrying out packet communication.

Secondly, using an analog/digital converter to demodulate a digital modulation signal interferes with achieving lower cost and lower power consumption of the entire system. This problem occurs because high-resolution analog/digital circuits are required, complicating the achievement of smaller circuits having lower power consumption. The prior art handles received signals as discrete time signals, and it is believed that there is potential for schemes that achieve lower power consumption and smaller circuit scale that are characteristic of digital circuits.

It is an object of the present invention to provide a compact and inexpensive digital wireless receiver having low power consumption.

Means for Solving the Problem

The digital wireless receiver of the present invention includes:

a radio frequency band selection filter for selecting and supplying as output a frequency band that is used in communication from a signal that has been received as input;

an amplifier for receiving the signal supplied from the radio frequency band selection filter and amplifying the signal;

a sample-hold circuit for receiving the signal supplied from the amplifier and converting that signal to a discrete time signal at a sampling frequency that is at least twice the frequency band of that signal;

a digital filter for selecting and supplying only the frequency band used in communication from among the discrete time signals supplied from the sample-hold circuit;

a demodulation circuit for receiving the signal supplied from the digital filter and that is activated only for a time interval equivalent to a one-wavelength portion of that signal to demodulate the signal; and a shut-down circuit for: receiving the digital signal that has been demodulated by and supplied from the demodulation circuit and finding the demodulation error rate; checking whether this error rate satisfies a demodulation error rate stipulated by a communication standard; when the error rate does not satisfy the demodulation error rate, successively extending the demodulation time of the demodulation circuit from a one-wavelength portion of the modulated signal until the communication standard is satisfied; and activating and shutting down the system for distributing sampling clocks to the sample-hold circuit, the digital filter, the amplifier, and the radio frequency band selection filter at the same time as the demodulation circuit.

The present invention enables a substantial decrease of the power consumption of a digital wireless receiver. The reason for this decrease is that the carrier wave frequency of digital wireless communication is usually from several hundred to several thousand times the baseband frequency, and if the minimum necessary detection is carried out in one modulation interval and an error rate of the demodulated data within the standard value is confirmed, a reduction of power consumption can be achieved by shutting down the demodulation circuit and other components.

In addition, the present invention realizes a compact digital wireless receiver. As the reason for this reduction in size, subjecting a radio modulated signal to discrete time processing facilitates the elimination of analog circuit elements that impede circuit downsizing and integration, and further, can facilitate greater performance with future advances in processing technology when compared to a case in which demodulation is carried out for an unaltered continuous signal.

Figure 1:
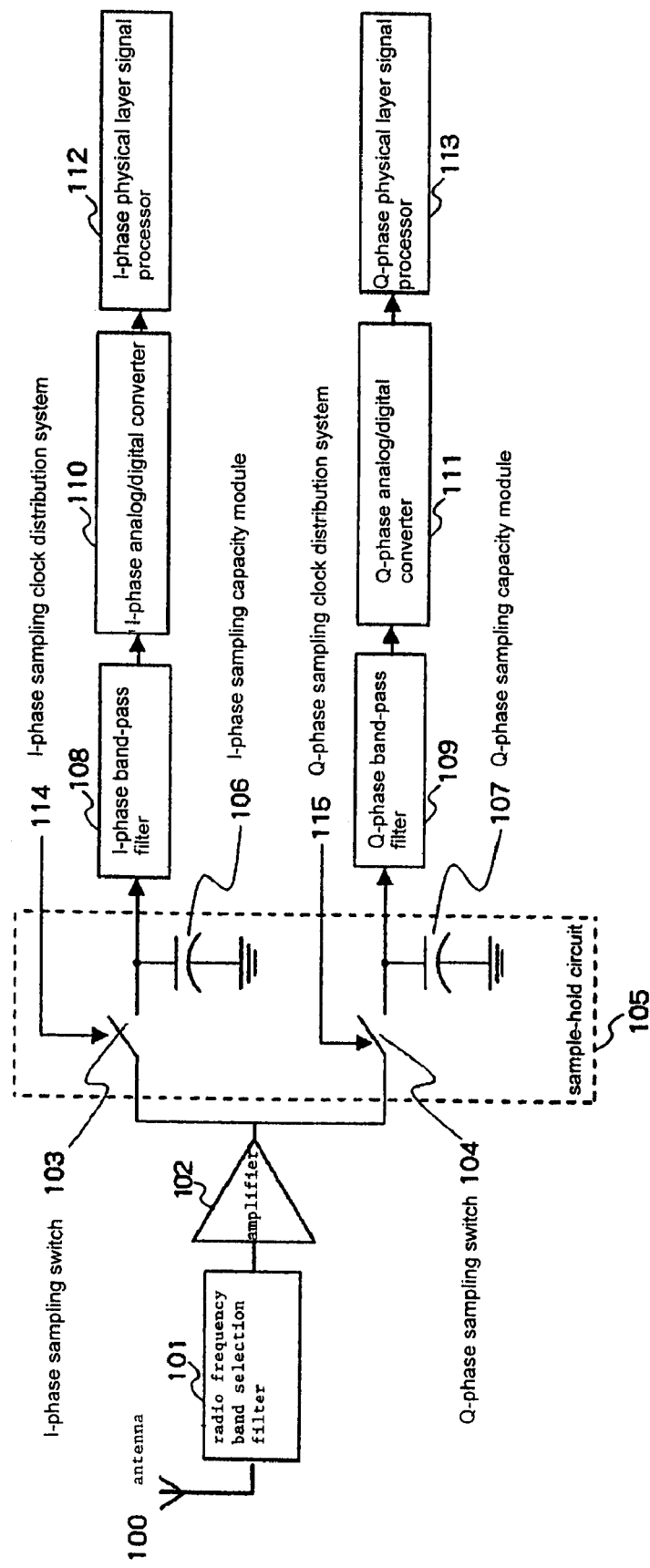
FIG. 1 is a block diagram showing an example of a digital wireless receiver of the prior art.

EXPLANATION OF REFERENCE NUMBERS 100 antenna
101 radio frequency band selection filter
102 amplifier
103 I-phase sampling switch
104 Q-phase sampling switch
106 I-phase sampling capacity module
107 Q-phase sampling capacity module
108 I-phase band-pass filter
109 Q-phase band-pass filter
110 I-phase analog/digital converter
111 Q-phase analog/digital converter
112 I-phase physical layer signal processor
113 Q-phase physical layer signal processor
114 I-phase sampling clock distribution system
115 Q-phase sampling clock distribution system
105, 201, 501, 701, 901, 1101 sample-hold circuit
200 sampling switch
202 sampling capacity module
203 band-pass filter
204 shut-down circuit
205A, 205B, 205C, 205D demodulation circuit
206 transmission quality determination module
207 sampling time determination module
208 stop signal supply module
209 clock generator
210 physical layer signal processor
211A, 211B, 211C carrier wave reproduction circuit
212 sampling clock distribution system
400 demodulation band-pass filter
401 narrow band-pass filter for passing Fc+$\Delta$f
402 narrow band-pass filter for passing Fc−$\Delta$f
403 comparison circuit
301-308 Steps

BEST MODE FOR CARRYING OUT THE INVENTION

First Embodiment

Figure 2:
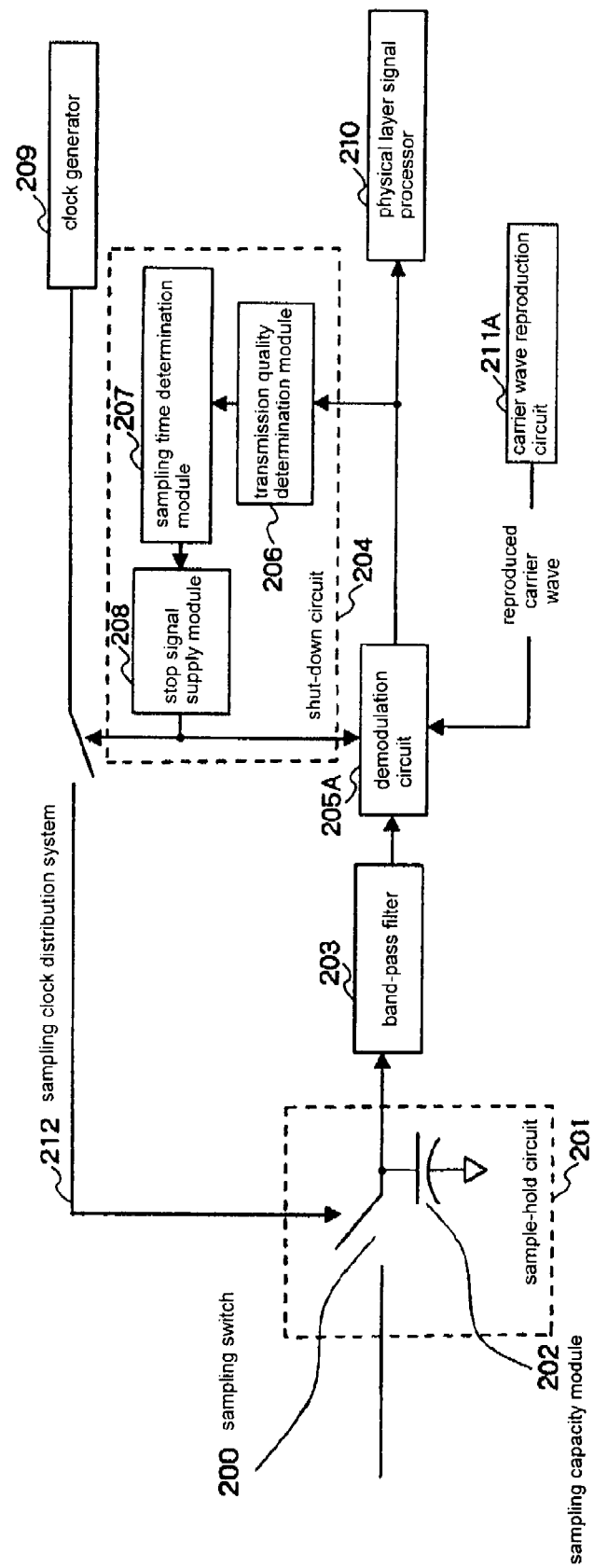
FIG. 2 is a block diagram showing the configuration of a digital wireless receiver according to a first embodiment of the present invention.

FIG. 2 is a block diagram of the digital wireless receiver according to a first embodiment of the present invention. Clock generator 209 generates sampling clocks. Carrier wave reproduction circuit 211A reproduces the carrier wave. Sample-hold circuit 201 receives sampling clocks that are supplied from clock generator 209 by way of sampling clock distribution system 212, samples the input signal (the output signal of amplifier 102 in FIG. 1), and then holds for a predetermined period of time to produce a discrete time signal. Band-pass filter 203 eliminates unnecessary aliasing components and undesired frequency components that have been generated by discretization of the signal. Demodulation circuit 205A compares the input signal from band-pass filter 203 and the reproduced carrier wave in an extremely short period of time to produce a baseband signal and transmits the baseband signal to physical layer signal processor 210. Shut-down circuit 204 receives the baseband signal that has been demodulated at demodulation circuit 205A and, as appropriate, shuts down the operation of demodulation circuit 205A, sampling clock distribution system 212, and other amplifiers and filters (amplifier 102 and radio frequency band filter 101 in FIG. 1) that are consuming power in the receiver.

Sample-hold circuit 201 includes sampling switch 200 that repeats on/off operation in accordance with the sampling clocks and samples the input signal at each predetermined time interval, and sampling capacity module 202 that accumulates and holds for a predetermined period of time the signal that is supplied from sampling switch 200.

Shut-down circuit 204 includes transmission quality determination module 206, sampling time determination module 207, and stop signal supply module 208. Transmission quality determination module 206 receives the baseband signal that has been demodulated and supplied by demodulation circuit 205A, calculates the demodulation error rate, and determines whether this demodulation error rate satisfies the value as stipulated by the communication standards. If it is determined that the demodulation error rate does not satisfy the value as stipulated by the communication standard, then sampling time determination module 207 determines the minimum demodulation time for satisfying the communication standard based on the demodulation error rate calculated by transmission quality determination module 206. Based on the demodulation time that has been determined by sampling time determination module 207, stop signal supply module 208 supplies a signal for shutting down demodulation circuit 205, sampling clock distribution system 212, and the amplifiers and filters.

Figure 3:
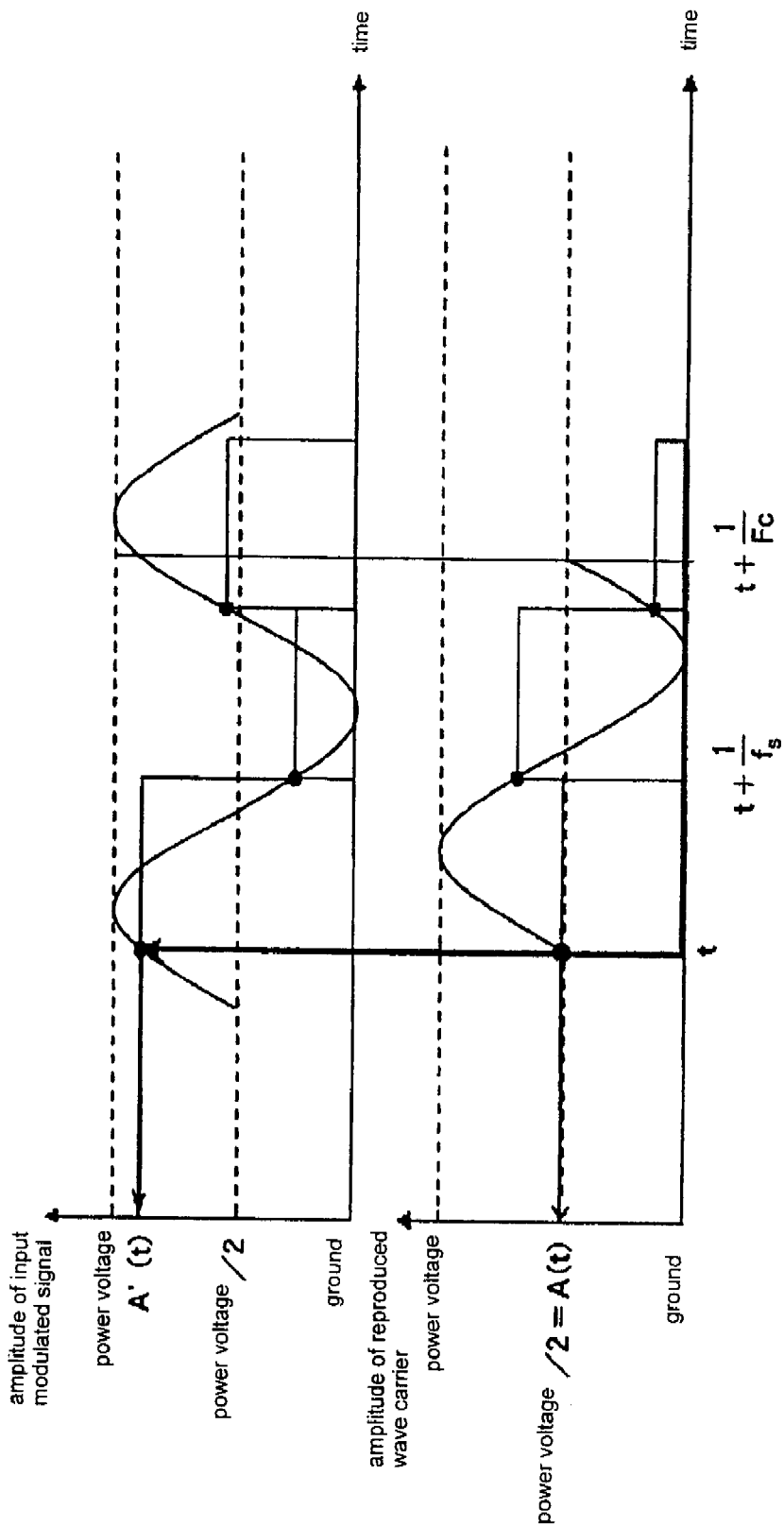
FIG. 3 shows an actual example of the operation of the demodulation circuit in the first embodiment.
Figure 4:
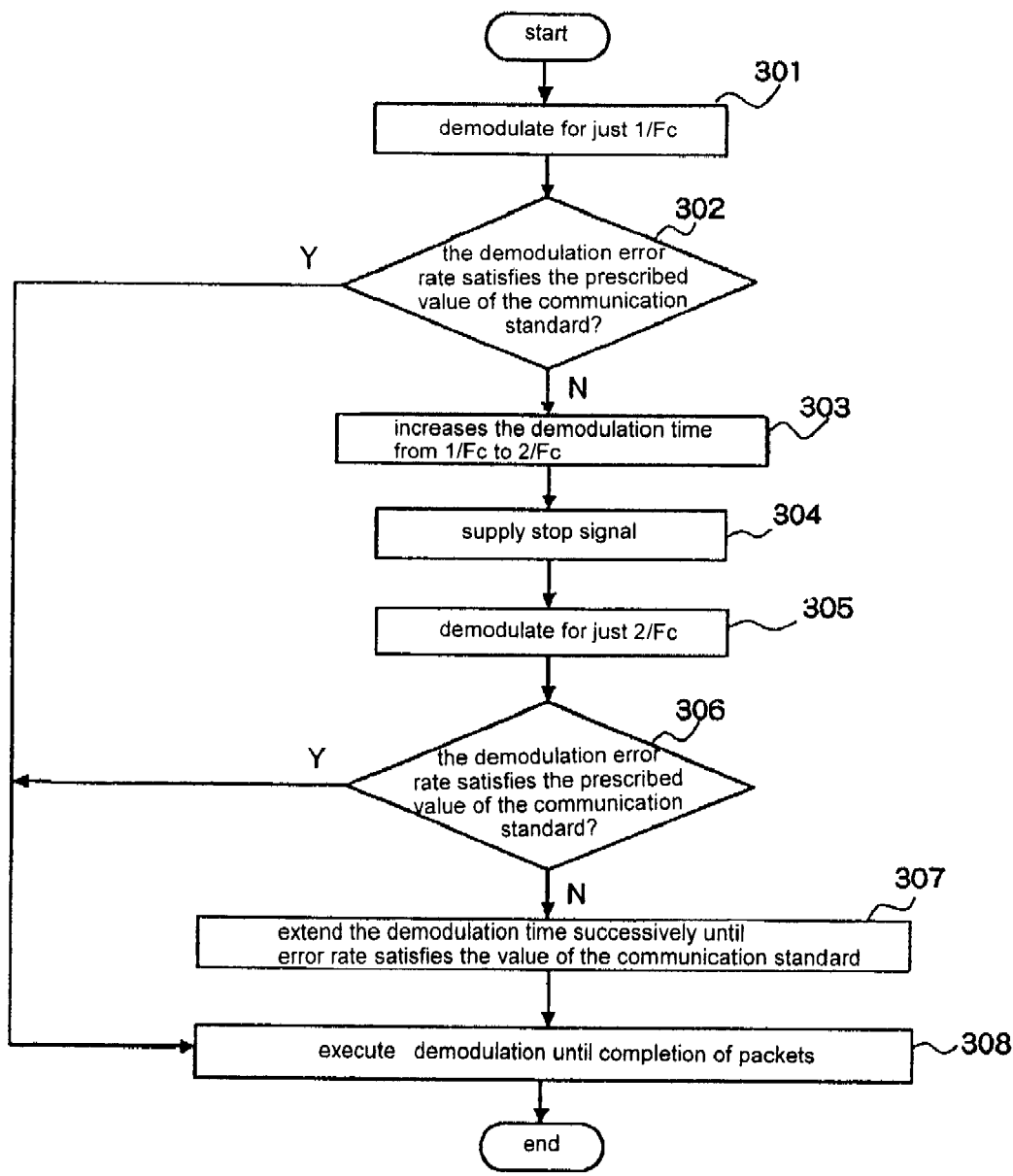
FIG. 4 is a flow chart showing the procedure for determining demodulation time.

Operation of the wireless signal receiver of the present embodiment will now be described with reference to FIGS. 2, 3, and 4. For the sake of simplification, offset quadrature phase shift keying (O-QPSK) in which a baseband signal is band-limited to a sine wave is taken by way of a simple example of digital modulation. In the case of typical quadrature phase-shift keying, the phase of the carrier wave is moved in four types: 45°, 135°, 225° and 315°, and binary signals are placed in correspondence with each of these types to transmit digital data. But no particular restriction is placed on the data transition pattern. As a result, there are three phase transition patterns: ±90° phase shifts and a 180° phase shift. However, the data transition of the 180° phase shift is not permitted in offset quadrature phase-shift keying, leaving only two types: ±90° phase shifts. In addition, when the band of the baseband is limited to a sine wave, the speed at which the phase is moved by modulation is fixed, and the envelope of the modulated wave is also fixed and therefore simple. Thus, shifting the phase +90° can be regarded as frequency modulation in which the frequency is further superposed by the positive value from the carrier wave frequency. The same applies to a case in which the phase is shifted −90° in the opposite direction. Essentially, in the case of a modulation scheme in which phase is shifted at the speed of a particular standard, it is possible to see from the waveform that frequency modulation is being implemented.

This modulation scheme is adopted in, for example, the physical layer of the 802.15.4 standards for Low Rate Wireless Personal Area Networks (WPANs) standardized in the International Institute of Electrical and Electronics Engineers. Now, assume the symbol rate is Fr. Further, assume these modulation conditions are identical in the second and succeeding embodiments.

The input signal that has passed through radio frequency band selection filter 101 and amplifier 102 in FIG. 1 and thus undergone frequency selection and amplification is applied as input to sample-hold circuit 201 with a center frequency Fin. Sampling switch 200 that is located in the first stage of sample-hold circuit 201 and that is driven and repeats on/off operation in accordance with sampling clocks having frequency fs that are supplied from clock generator 209, samples the voltage amplitude of the input signal for each sampling clock period 1/fs and sends this value to sampling capacity module 202 of the succeeding stage. Sampling capacity module 202 holds the value of the sampled input signal for the interval of 1/fs of a sampling clock period. This holding time is a value that can be changed by, among other factors, the duty-cycle of the sampling clock or the circuit configuration of sample-hold circuit 201. In this way, the input signal is converted from a continuous time signal to a discrete time signal in sample-hold circuit 201 and then supplied to band-pass filter 203 of the next stage and demodulation circuit 205A. Sample-hold circuit 201 at succeeding stages can thus carry out data processing and circuit operations using digital signals. In addition, due to the conversion to a discrete time signal, the signal that is supplied from this sample-hold circuit 201 contains a multiplicity of frequency components other than the initial input center frequency Fin. As described in the explanation of the operation of the prior art, this content occurs because the data values are discrete and undesired frequency components can also be reproduced from these sampled data, and this content is typically called "alias." Band-pass filter 203 of the next stage is used to eliminate these aliases and unnecessary mixed components from other communication standards. If band-pass filter 203 selects and extracts only one desired frequency component Fc from among the multiplicity of alias components that have occurred in sample-hold circuit 201, then the center frequency of the band can be converted from Fin to Fc while maintaining the digital baseband signal. Sample-hold circuit 201 and band-pass filter 203 are therefore combined in the present invention to carry out frequency selection and conversion.

The discrete time signal delivered as output from sample-hold circuit 201 is supplied to band-pass filter 203 in the next stage. This band-pass filter 203 is a digital filter for handling discrete time signals. As band-pass filter 203, either an infinite impulse response filter in which the signal delivered as output from the filter is returned to input (feedback) and used in calculation, or a finite impulse response filter that does not feed back the output signal, can be used. However, since the filter used here selects and extracts only the signal band being used in communication and supplies demodulation circuit 205A at the next stage, it must be able to exclude signals from other communication standards or signals of neighboring channels of the same standard. For this reason, band-pass filter 203 must be able to pass signals of a narrow band, and further, must have a high frequency cut-off characteristic. The reason for this requirement is that, due to the characteristics of demodulation circuit 205A, when signals of undesired channels are received as input during demodulation, the signals cannot be separated and interfere with the demodulation operation, as described below.

In the case of a typical infinite impulse response filter, a low filter order of from quadrature to sextic satisfies the previously described specifications, but selectively passing a narrow-band signal causes the poles of the filter to approach, raising the potential for an unstable filter that brings with it the danger of oscillation. On the other hand, although a finite impulse response filter is free of the above-described danger of oscillation, such a filter may have a filter length as much as ten times that of an infinite impulse response filter having the same characteristics, which is likely to raise the chip unit cost.

In demodulation circuit 205A, the waveform of a modulated signal that has undergone frequency conversion and selection is compared with the reproduced carrier wave that serves as reference, whereby the baseband signal is extracted and demodulation realized. Reproduction of the carrier wave is described herein. In digital radio communication, data transmission is typically carried out in packet form, and this communication prescribes the flow for a fixed period of time of a fixed training signal referred to as the preamble at the header portion of the packet before transmission of actual data. In accordance with this preamble, the receiver is able to prepare an environment necessary for actual data reception such as frequency-locking/phase synchronization in the frequency synthesizer, whereby demodulation can be carried out. Thus, by utilizing the preamble, the carrier wave of the frequency used in communication can be reproduced and then applied as input to demodulation circuit 205A and submitted for demodulation. The previously described series of operations is assumed to be carried out in carrier wave reproduction circuit 211A.

The modulated signal, the frequency of which has been converted from Fin to Fc in sample-hold circuit 201 and band-pass filter 203 is applied as input to demodulation circuit 205A together with the carrier wave that has been reproduced in carrier wave reproduction circuit 211A, where the baseband signal is extracted and demodulated. FIG. 3 shows the operation of demodulation circuit 205A. As shown in FIG. 3, during 1/Fr, which is the time period during which modulation is carried out at one symbol, demodulation circuit 205A is activated for just 1/Fc, which is equivalent to a one-period portion of the center frequency of the modulated signal, to read a one-wave portion of the modulated signal waveform (Step 301). At the same time t, the waveform of the reproduced carrier wave is also read. In this example, a case is considered in which the phase of the reproduced carrier wave at time t is zero and the phase of the received modulated signal is +90° shifted. As described in the explanation of the modulation scheme, at the phase shift of +90°, frequency modulation of a particular positive value Δf can be considered to be applied. Therefore, if a sine wave that oscillates from ground point 0 to power supply voltage Vdd is assumed to be applied to demodulation circuit 205A, and if reproduced carrier wave A(t) at a particular time t is expressed as $A(t)=(Vdd/2)[1+\sin(2\pi Fct)]$, then modulated wave A'(t) that has undergone +90° phase shift is $A'(t)=(Vdd/2)[1+\sin(2\pi(Fc+\Delta f)t)]$. If the phase of reproduced carrier wave A(t) is zero at time t, A'(t) is $A'(t)=(Vdd/2)[1+\sin(2\pi(1+\Delta f/Fc)N)]$ from the simple calculation of a sine wave, where N is an integer. When time t of reading the waveform is close to symbol start time 0 and input frequency Fc is sufficiently faster than the speed of change Δf of the baseband signal waveform, $(Vdd/2)<A'(t)<Vdd$. Essentially, using a comparison circuit to determine whether the voltage amplitude of the modulated wave at time t is greater than or smaller than Vdd/2 enables a determination of whether modulation of +90° phase shift or modulation of −90° phase shift is being carried out, whereby demodulation can be carried out. It is to be noted that the phase need not be zero at time t, and using all sample points during 1/Fc and appropriately increasing the number of divisions from the ground point to the power supply voltage to read the waveform enables waveform comparison and demodulation at any carrier wave phase. However, time t must be selected with sufficient delay from the symbol start point to enable avoidance of interference between symbols that results from multipath delay.

As soon as demodulation is completed, demodulation circuit 205A is again immediately shut down.

This demodulated baseband signal is sent to physical layer signal processor 210 and at the same time is also sent to transmission quality determination module 206. This transmission quality determination module 206 finds the demodulation error rate and determines whether or not the demodulation error rate satisfies the predetermined value of the communication standard (Step 302). In the case of packet communication, the previously described preamble is typically transmitted before carrying out actual data transmission, following which a fixed training signal for determining the transmission state is sent within the packet, and this training signal can be utilized when finding the demodulation error rate.

When the demodulation error rate found in transmission quality determination module 206 does not satisfy the communication standard value, sampling time determination module 207 increases the demodulation time from 1/Fc to 2/Fc and this 2/Fc is taken as the demodulation time at the next symbol (Step 303). According to the demodulation time of the next symbol that is thus determined, a signal for shutting down the operations of demodulation circuit 205A, sampling clock distribution system 212, and other amplifiers and filters is supplied from stop signal supply module 208 (Step 304), and the operation/shut-down of the functions of demodulation circuit 205A and other blocks is effected at the next symbol.

If the demodulation error rate does not satisfy the communication standard despite extension of the demodulation time to 2/Fc at the next symbol, the demodulation time is successively extended to 3/Fc, 4/Fc, and so on (Steps 305, 306, 307). By means of this operation, the circuit shut-down time can be altered as appropriate according to transmission quality. Based on the demodulation time that has been determined, demodulation of data signals is executed until the packets are completed (Step 308).

In the present embodiment, since sampling clocks are supplied to sample-hold circuit 201 and power is supplied to demodulation circuit 205A and other components for the minimum period of time required for demodulation, and at other times, the operation of the receiver is shut down, the power consumption of the receiver can be substantially reduced. For example, consider a case in which a modulated signal is applied as input to demodulation circuit 205A at Fc=100 MHz for a standard in which the modulation time 1/Fr is 500 nanoseconds. If it is herein assumed that the time expended in detection of the phase modulation is 1/Fc=10 nanoseconds and the rise and fall of the circuit can each be 1 nanosecond, the power consumption of demodulation circuit 205A is substantially lower than a case in which the circuit is operated continuously as follows: [(10+1+1)/500]× 100=2.4%. Herein, it is further assumed that the standby power can be ignored.

Second Embodiment

Figure 5:
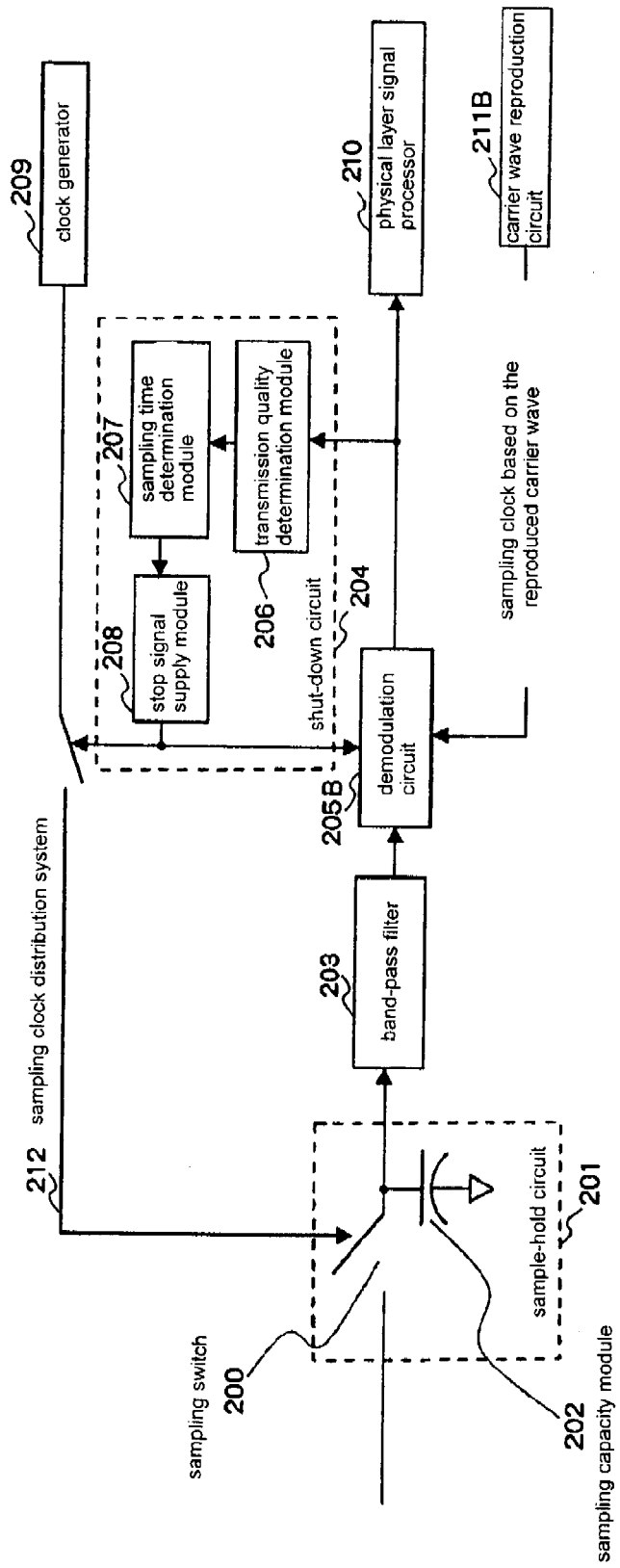
FIG. 5 is a block diagram showing the configuration of a digital wireless receiver according to a second embodiment of the present invention.

FIG. 5 is a block diagram of the digital wireless receiver of the second embodiment of the present invention. The present embodiment differs from the digital wireless receiver of the first embodiment in that the carrier wave reproduced in carrier wave reproduction circuit 211B is applied as a sampling clock to demodulation circuit 205B and timing synchronization is established when reading the modulated waveform.

Operation of the present embodiment will be explained below. Here, only the operation that differs from the previously described first embodiment is presented.

Figure 6:
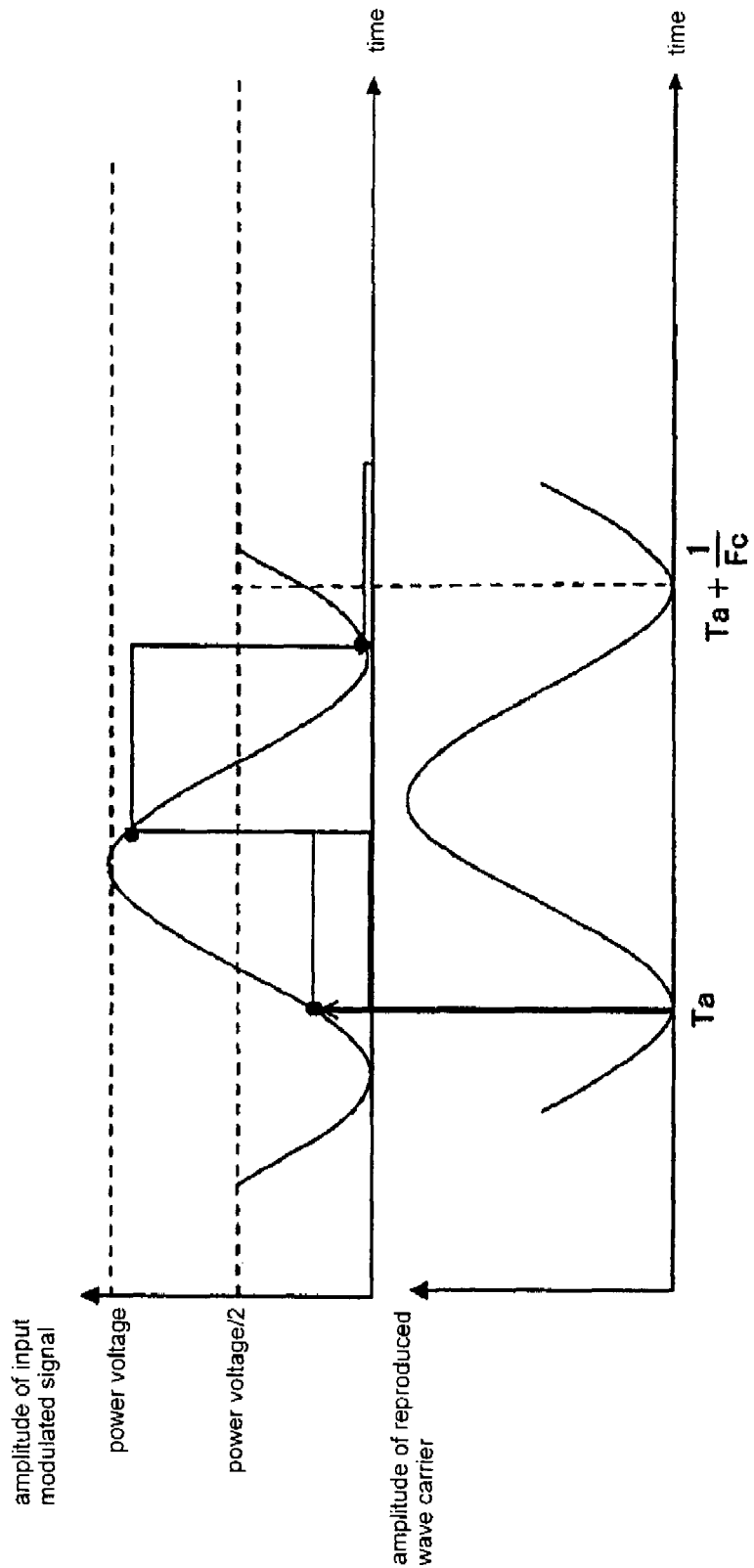
FIG. 6 shows an actual example of the operation of the demodulation circuit in the second embodiment.

After the input signal has undergone frequency conversion from Fin to Fc, the input signal is applied as input to demodulation circuit 205B. FIG. 6 shows the operation of demodulation circuit 205B. As shown in FIG. 6, during 1/Fr in which modulation is carried out at one symbol, demodulation circuit 505B is activated in synchronization with the rise time Ta of the reproduced carrier wave and is operated for only 1/Fc, which corresponds to one period of the center frequency of the modulated signal, to read a one-wave portion of the modulated signal waveform. It is determined whether phase modulation is being carried out in either the positive or negative angular direction from the voltage amplitude of the modulated signal that was read at time Ta, and demodulation is then performed. In the modulated signal shown in FIG. 6, phase modulation is carried out in the positive angular direction. In this example, the frequency of the modulated signal is higher than that of the reproduced carrier wave and the phase of the modulated signal is therefore advanced with respect to the carrier wave at Ta, and the voltage amplitude of the modulated signal at Ta is thought to be between 0 and Vdd/2, assuming the ground point is 0 and the power supply voltage is Vdd. In contrast, when phase modulation is being carried out in the negative direction, the phase of the modulated signal lags behind that of the carrier wave, and the voltage amplitude of the modulated signal at Ta is therefore thought to be between Vdd/2 and Vdd. As a result, comparing the voltage amplitude of the modulated signal at time Ta with Vdd/2 enables determination of whether phase modulation is being carried out in the positive direction or negative direction, and thus enables demodulation.

Here, the reproduced carrier wave is used for indicating to demodulation circuit 205B the rise time of the wave, and is not used for comparison with the input signal. In other words, the voltage amplitude and other information carried by the reproduced carrier wave are not used in the demodulation operation.

The operations that follow demodulation are the same as in the first embodiment.

In the present embodiment, only the amplitude of the input modulated signal need be read, and information required for demodulation is not carried in the amplitude of the reproduced carrier wave. As a result, the circuit configuration of demodulation circuit 205B is simpler than in the first embodiment.

Third Embodiment

Figure 7:
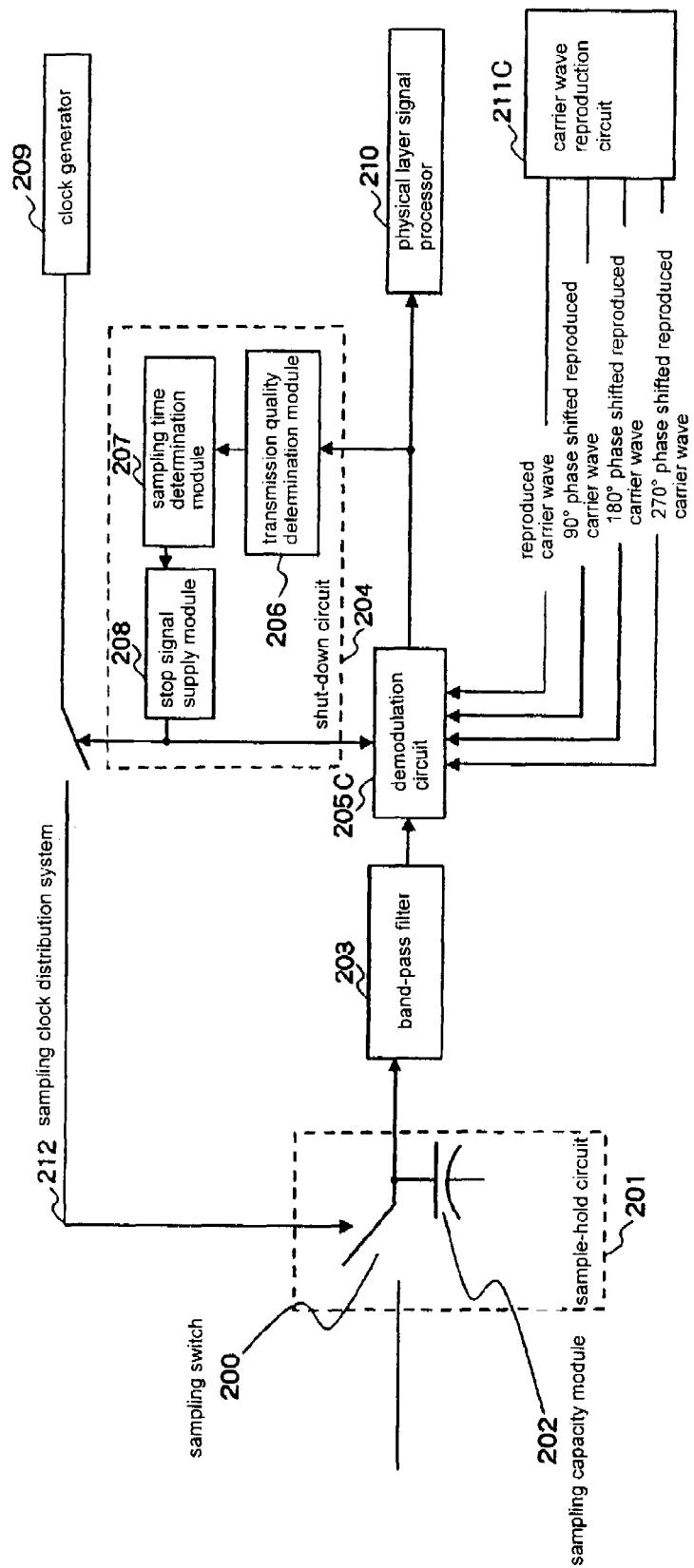
FIG. 7 is a block diagram showing the configuration of the digital wireless receiver according to a third embodiment of the present invention.

FIG. 7 is a block diagram of the digital wireless receiver of a third embodiment according to the present invention. The present embodiment differs from the digital wireless receiver of the first embodiment in that carrier waves of four phases in which the phase is delayed every 90° are reproduced in carrier wave reproduction circuit 211C, and these carrier waves of four phases are all applied as input to demodulation circuit 205C.

Operation of the digital wireless receiver of the present embodiment will now be explained below. Here, only operations that differ from the previously described first embodiment are presented.

Figure 8:
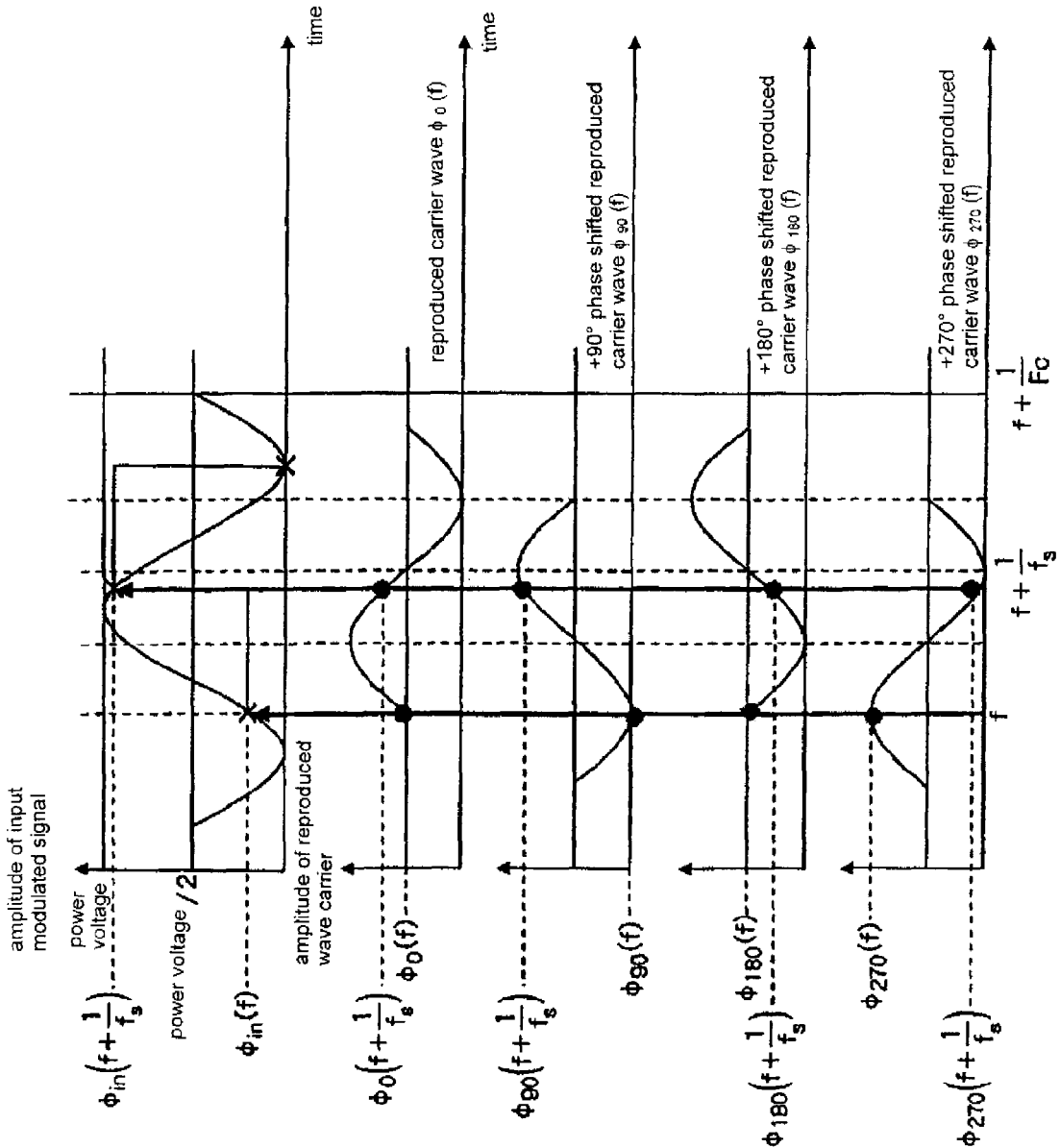
FIG. 8 shows an actual example of the operation of the demodulation circuit in the third embodiment.

The frequency of the modulated signal input is converted from Fin to Fc and then applied as input to demodulation circuit 205C. At the same time, reproduced carrier waves in which the phase has been delayed 0°, 90°, 180°, and 270°, respectively, from the carrier wave are also applied as input to demodulation circuit 205C. FIG. 8 shows the operation of demodulation circuit 205C. As shown in FIG. 8, demodulation circuit 205C is activated at a particular time f for only the interval of 1/Fc, which corresponds to a one-period portion of the center frequency of the modulated signal, and the voltage amplitude $\phi$ in (f) of the modulated signal at time f is read. At the same time, the voltage amplitudes $\phi0(f)$~$\phi270(f)$ at time f of each of the reproduced carrier waves of four phases that are applied as input to demodulation circuit 205C are also read. Referring to FIG. 8, it can be seen that the reading of the waveforms of the modulated wave and the reading of reproduced carrier waves of four phases are carried out at the same time.

In this example, it is assumed that the modulated signal undergoes phase modulation in which the phase is delayed between 0° and 90° with respect to the carrier wave, and the phase of φ0 at time f is zero. First, the voltage amplitudes φ in (f), φ0(f), φ90(f), φ180(f), and φ270(f) of each of the modulated signals and the reproduced carrier waves of four phases are read at time f. If the power supply voltage is assumed to be Vdd, then: 0<φ in (f)<(Vdd/2); whereby it can be understood that the phase delay of the modulated signal from the carrier wave at this time is between 0° and 180°. Further, because (Vdd/2)<φ in (f+(1/fs))<Vdd at the next sample point f+(1/fs), it can be seen that the phase delay of the modulated signal at this stage is between 0° and 90°. In typical quadrature phase-shift keying, phase modulation in which the phase is delayed from 0° to 90° corresponds to the binary signal "10," and demodulation ends at the time of this waveform comparison. The above-described example is a case in which demodulation is carried out by reading the amount of voltage amplitude at two sample points in a one-period portion of the modulated wave and then determining the carrier waveform of the phase shift 0°-270° to which the waveform of φ in (f) is close.

The operations that follow demodulation are identical to those of the first embodiment.

In the present embodiment, reading the voltage amplitude of the modulated signal waveform at time f enables easy determination of which of the four regions of 0°-90°-180°-270°-360° the amount of phase modulation is to be classified. In the case of QPSK modulation, in particular, these four spaces have a direct correspondence to binary signals and can therefore reduce the hardware load that is required up to demodulation.

It is to be noted that, in a normal wireless transceiver, modulated signals are handled by being separated into each of the I-phase and Q-phase, and the parts for preparing reproduced carrier waves of the four phases therefore do not result in greater complexity of the hardware than in a configuration of the prior art.

Fourth Embodiment

Figure 9:
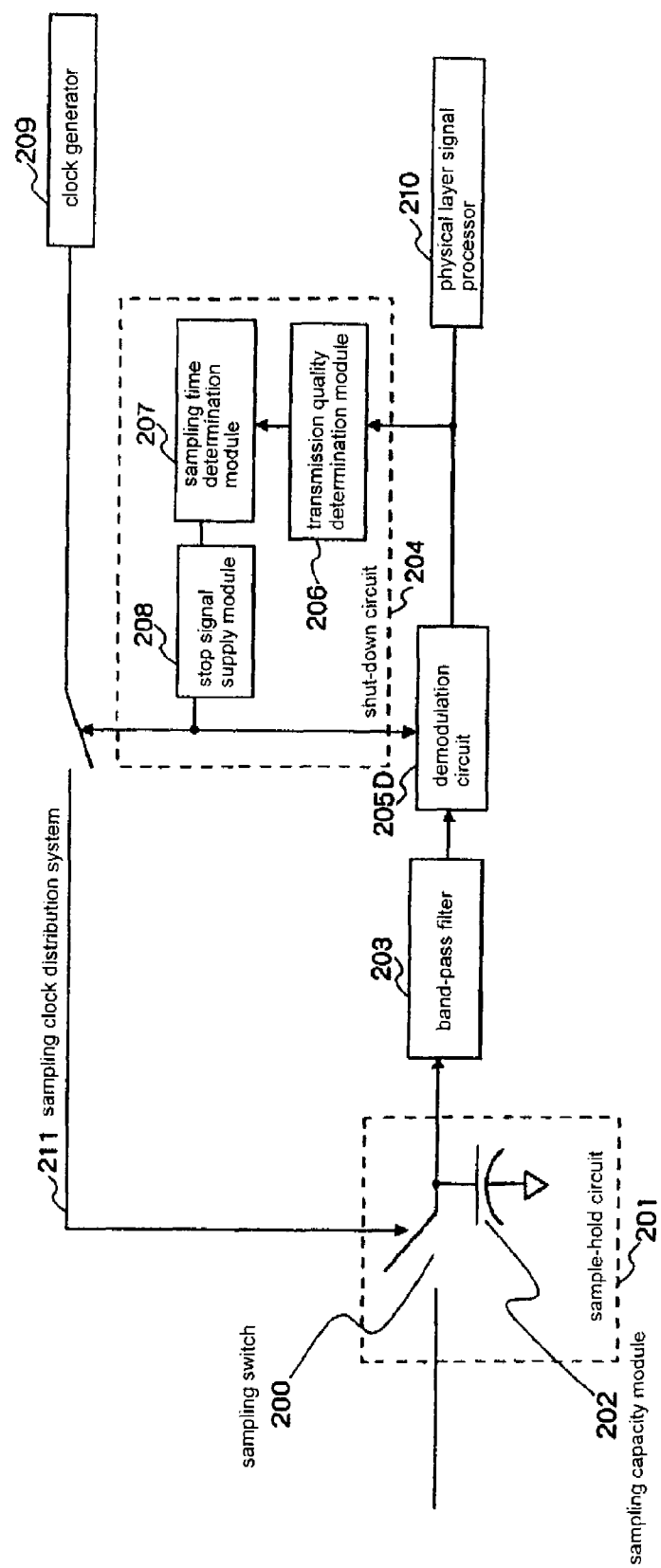
FIG. 9 is a block diagram showing the configuration of the digital wireless receiver according to a fourth embodiment of the present invention.

FIG. 9 is a block diagram of the digital wireless receiver of the fourth embodiment according to the present invention. The present embodiment differs from the digital wireless receiver of the first embodiment in that, in demodulation circuit 205D, the baseband signal is read from only the change in time of the phase of the input signal rather than by a comparison with the carrier waveform, and as a result, the carrier wave reproduction circuit is not required for the demodulation operation.

Figure 10:
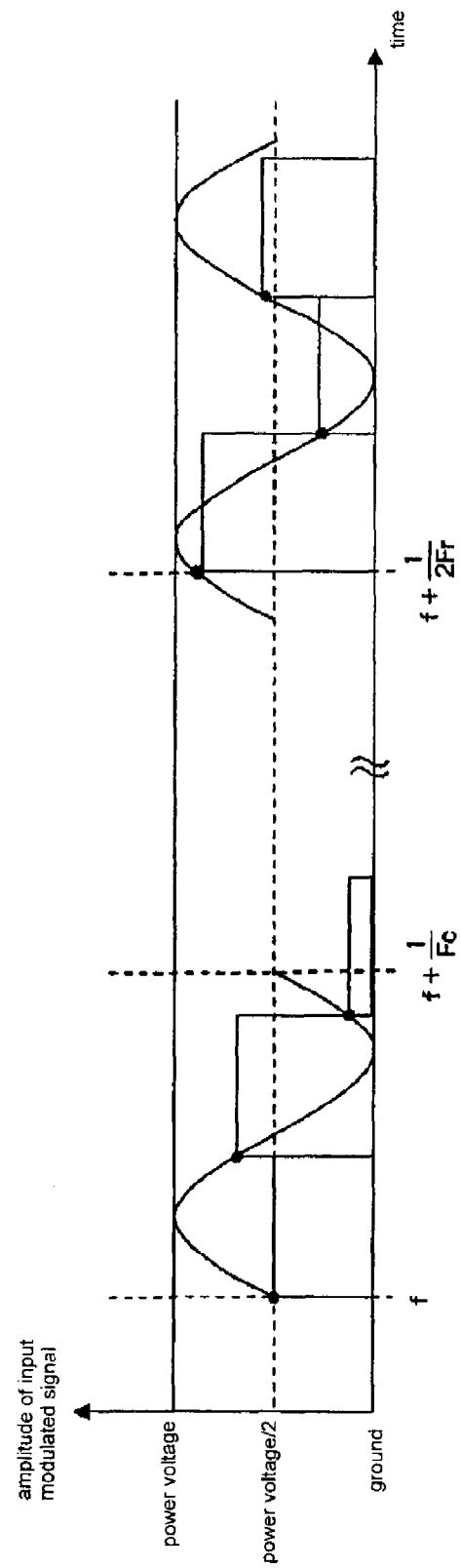
FIG. 10 shows the concepts of the demodulation operation in the fourth embodiment.

Operation of the digital wireless receiver of the fourth embodiment will be explained with reference to FIG. 10. As an example of phase modulation, a case is here treated in which phase shift occurs in a positive angular direction from 0° until 90° in the symbol interval from time 0 to time 1/Fr, and with the power supply voltage as Vdd, the voltage amplitude of modulated wave A'(f) at time f is represented as A'(f)=(Vdd/2)[1+sin(2π(Fc+Δf)f)]. Explanation here regards only operation that differs from that of the previously described first embodiment.

The input signal first undergoes frequency conversion from Fin to Fc and is then applied as input to demodulation circuit 205D. FIG. 10 shows the operation of demodulation circuit 205D. As shown in FIG. 10, demodulation circuit 205D is activated for only 1/Fc at time f, and after the voltage amplitude of the modulated wave has been read at each sample point, demodulation circuit 205D and other receiver components are quickly shut down. For the sake simplicity in this example, the phase of the modulated wave at time f is taken as 0 and the voltage amplitude of the modulated wave at time f is (Vdd/2).

Next, after a half-symbol interval, demodulation circuit 205D is again activated for only 1/Fc at corresponding time f+(½Fr), and after the voltage amplitude of the modulated wave has been read at each sample point, demodulation circuit 205D and other receiver components are immediately shut down. The voltage amplitude of modulated wave A' at time f+(½Fr), based on the simple calculation of a trigonometric function, is A'(f)=(Vdd/2)[1+sin(2π(Fc+Δf)/2Fr]. The speed of change Δf of baseband waveform and symbol rate Fr are values determined by the communication standard, and the input frequency Fc to demodulation circuit 205D is an already known value at the time of demodulation. Thus, if the phase of a modulated signal is read at time f, and further, if the time of again activating demodulation circuit 205D a second time to read the modulated signal waveform is determined, the voltage amplitude of the modulated signal at the second waveform reading can be predicted. For example, if it is assumed that Δf=0.5 MHz, Fc=100 MHz, and Fr=2.0 MHz, it can be predicted that A'(f+(½Fr))=0.85×Vdd. When phase shift occurs in a negative angular direction from 90° until 0°, A'(f+(½Fr))=0.15×Vdd can be predicted by the same logic. Based on the above-described results, a comparison of Vdd/2 and the power supply voltage at f+(½Fr) enables the determination of whether phase modulation is in the positive or negative direction and thus enables demodulation of signals.

Based on the demodulated baseband signal, the demodulation error rate is found in transmission quality determination module 206, and it is then determined whether the demodulation error rate satisfies the predetermined value in the communication standard. If the demodulation error rate found in transmission quality determination module 206 does not satisfy the communication standard, the demodulation time is increased from 1/Fc to 2/Fc in sampling time determination module 207 and is taken as the activation time interval of demodulation circuit 205D at the next symbol. In accordance with the demodulation time interval of the next symbol that has been determined, a signal for shutting down the operations of demodulation circuit 205D, sampling clock distribution system 211, and other amplifiers and filters is supplied from stop signal supply module 208, and the functions of demodulation circuit 205D and other blocks are activated/shut down at the next symbol. Here, the point of difference with the first embodiment is the plurality of readings of the voltage amplitude of the modulated wave within the same symbol interval in accordance with a demodulation time that has been increased from 1/Fc to 2/Fc.

If the demodulation error rate does not satisfy the communication standard despite extension of the demodulation time to 2/Fc at the next symbol that is received as input, the demodulation time is successively extended to 3/Fc, 4/Fc, and so on. By means of this operation, the circuit shut-down time interval can be adaptively altered according to the transmission quality.

Compared to the first embodiment, the present embodiment allows simplification of a receiver to the extent that reproduction of the carrier wave is not required. However, although demodulation is theoretically possible by detection at a single point in the first embodiment, detection must be carried out at a plurality of points in the present embodiment. Due to this point, the time interval in which demodulation circuit 205D must be activated is longer in the present embodiment than in the first embodiment, and power consumption therefore increases.

Fifth Embodiment

Figure 11:
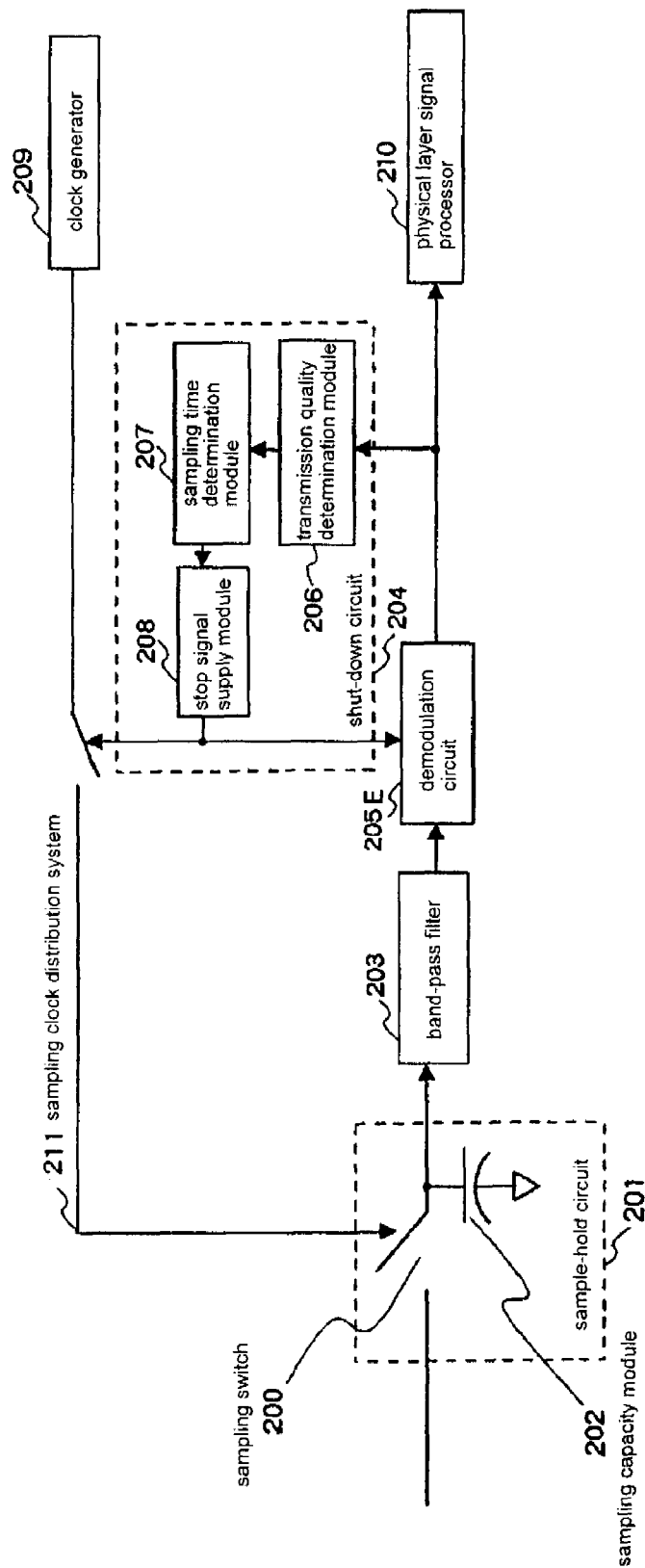
FIG. 11 is a block diagram showing the configuration of the digital wireless receiver according to a fifth embodiment of the present invention.
Figure 12:
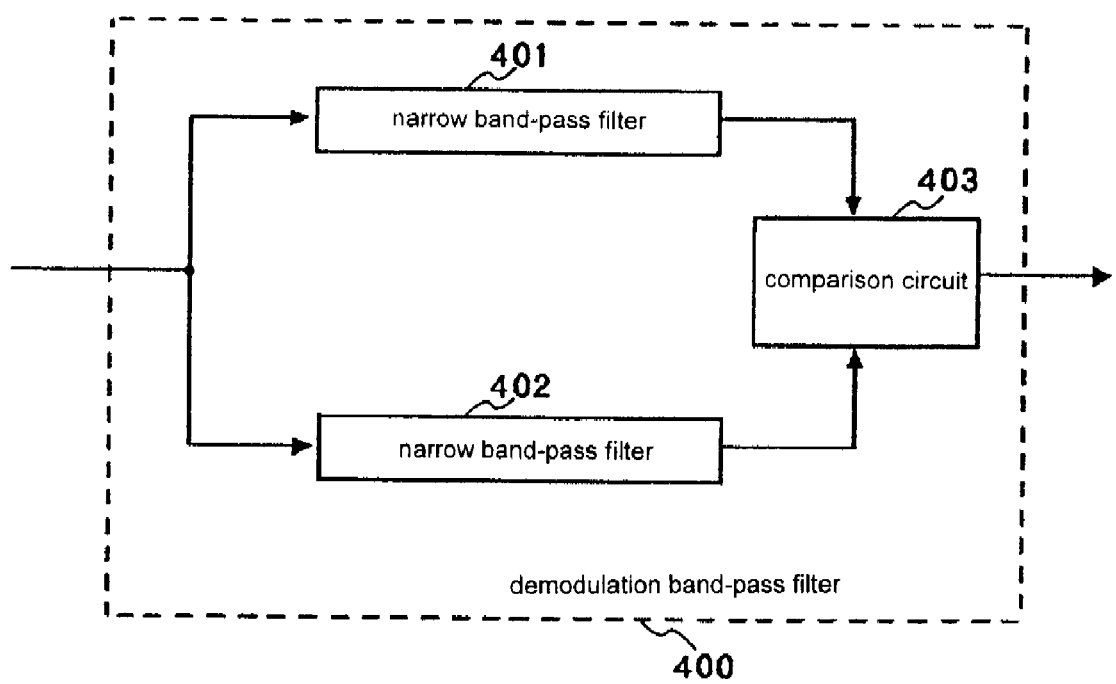
FIG. 12 is a block diagram showing the configuration of the demodulation module in the fifth embodiment.

FIG. 11 is a block diagram of the digital wireless receiver of the Fifth embodiment according to the present invention. The present embodiment differs from the digital wireless receiver of the first embodiment in that, rather than detecting the amount of phase modulation from the voltage amplitude of the modulated signal, narrow band-pass filter 401 that passes Fc+Δf and narrow band-pass filter 402 that passes Fc−Δf, as shown in FIG. 12 are used to detect the amount of shift Δf from the carrier wave frequency Fc to find the amount of phase modulation, following which demodulation is carried out. It is to be noted that demodulation band-pass filter 400 shown in FIG. 12 is contained in demodulation circuit 205E shown in FIG. 11.

Operation of the present embodiment will now be described. Here, only operations that differ from those of the previously described first embodiment are presented.

The input signal first undergoes frequency conversion from Fin to Fc and is then applied as input to demodulation band-pass filter 400 in demodulation circuit 205E. The input signal is simultaneously passed through narrow band-pass filter 401 that passes Fc+Δf and narrow band-pass filter 402 that passes Fc−Δf shown in FIG. 12, and the voltages supplied as output from each filter are compared in comparison circuit 403 that is located in the stage succeeding the two filters. Here, narrow band-pass filter 401 is a filter for passing only frequency shift amount +Δf when carrying out phase modulation in a positive angular direction, and narrow band-pass filter 402 is a filter for passing only frequency shift −Δf when carrying out phase modulation in a negative angular direction. These filters 401 and 402 are filters for handling discrete signals, but their transfer functions are fixed. A determination in comparison circuit 403 that the output of filter 401 is greater than the output of filter 402 enables the determination that phase modulation in the positive angular direction is being carried out, and an obtained result indicating that the output of filter 402 is greater than the output of filter 401 enables the determination that phase modulation is being carried out in the negative angular direction. Demodulation can then be performed based on the output results of comparison circuit 403.

Operations carried out after demodulation are the same as in the first embodiment.

In the present embodiment, since the data transition of the baseband signal is read from the amount of frequency shift, the present embodiment enables demodulation that has a higher signal-to-noise ratio than in the first, second, third, fourth embodiments that detect a time waveform that has been degraded by multipath interference.

What is claimed is:

1. A digital wireless receiver to which a digital modulated electrical signal is applied as an input, comprising:
    a radio frequency band selection filter for selecting and supplying, as an output, a frequency band, that is used in a communication, from said digital modulated electrical signal that has been applied as the input;
    an amplifier for receiving the digital modulated electrical signal supplied from said radio frequency band selection filter and amplifying the digital modulated electrical signal;
    a sample-hold circuit for receiving the amplified digital modulated electrical signal supplied from said amplifier and converting the amplified digital modulated electrical signal to a discrete time signal at a sampling frequency at least twice the frequency band of the amplified digital modulated electrical signal;
    a digital filter for selecting and supplying only the frequency band used in the communication, from among discrete time signals supplied from said sample-hold circuit and outputting a digital filtered signal;
    a demodulation circuit which receives the digital filtered signal supplied from said digital filter and is activated only for a time interval equivalent to a one-wavelength portion of the digital filtered signal to demodulate the digital filtered signal and output a digital demodulated signal; and
    a shut-down circuit for receiving the digital demodulated signal that has been demodulated by and supplied from said demodulation circuit to determine a demodulation error rate, for checking whether the demodulation error rate satisfies a demodulation error rate stipulated by a communication standard, wherein, when the demodulation error rate does not satisfy the stipulated demodulation error rate, the shut-down circuit successively extends a demodulation time of said demodulation circuit from the one-wavelength portion of the modulated electrical signal until the stipulated demodulation error rate of the communication standard is satisfied, and for activating and shutting down distributing sampling clocks to said sample-hold circuit, said digital filter, said amplifier, and said radio frequency band selection filter at the same time as to said demodulation circuit.

2. The digital wireless receiver according to claim 1, further comprising a carrier wave reproduction means for reproducing a carrier wave having the same frequency and having the same phase as the carrier wave used in the communication, for converting the frequency of the reproduced carrier wave to the same frequency as a center frequency of said digital filtered signal supplied as an output from said digital filter, and for supplying the reproduced carrier wave to said demodulation circuit.

3. The digital wireless receiver according to claim 2, wherein said carrier wave reproduction means reproduces, from said carrier wave that has been reproduced, carrier waves in which phase is shifted 90°, 180°, and 270° and supplies the reproduced carrier waves of a total of four phases to said demodulation circuit.

4. The digital wireless receiver according to claim 2, wherein said demodulation circuit simultaneously compares an amplitude of the reproduced carrier wave supplied from said carrier wave reproduction means and an amplitude of the digital filtered signal supplied from said digital filter to read a baseband signal and carries out demodulation.

5. The digital wireless receiver according to claim 2, wherein said demodulation circuit uses the reproduced carrier wave supplied from said carrier wave reproduction means as a synchronizing signal to read an amplitude of the digital filtered signal supplied from said digital filter and carries out demodulation.

6. The digital wireless receiver according to claim 3, wherein said demodulation circuit simultaneously compares amplitudes of all of the carrier waves of four phases supplied from said carrier wave reproduction means and an amplitude of the digital filtered signal supplied from said digital filter to read a baseband signal and carries out demodulation.

7. The digital wireless receiver according to claim 1, wherein said demodulation circuit carries out demodulation by reading a change over time of an amplitude of the digital filtered signal supplied from said digital filter.

8. The digital wireless receiver according to claim 1, wherein said demodulation circuit carries out demodulation by reading a difference between a frequency band of the digital filtered signal supplied from said digital filter and a carrier wave frequency.

* * * * *